US011821994B2

(12) United States Patent
Mansour et al.

(10) Patent No.: US 11,821,994 B2
(45) Date of Patent: Nov. 21, 2023

(54) LOCALIZATION OF AUTONOMOUS VEHICLES USING CAMERA, GPS, AND IMU

(71) Applicant: NEW EAGLE, LLC, Ann Arbor, MI (US)

(72) Inventors: Iyad Faisal Ghazi Mansour, Auburn Hills, MI (US); Kalash Jain, Bloomfield Hills, MI (US); Akhil Umat, Auburn Hills, MI (US)

(73) Assignee: NEW EAGLE, LLC, Ann Arbor, MI (US)

( * ) Notice: Subject to any disclaimer, the term of this patent is extended or adjusted under 35 U.S.C. 154(b) by 261 days.

(21) Appl. No.: 17/362,215

(22) Filed: Jun. 29, 2021

(65) Prior Publication Data
US 2022/0413162 A1 Dec. 29, 2022

(51) Int. Cl.
*G01S 19/31* (2010.01)
*G01C 21/00* (2006.01)
*G06K 9/00* (2022.01)
*G06K 9/62* (2022.01)
*H04N 13/239* (2018.01)
*G06V 20/56* (2022.01)
*G06F 18/22* (2023.01)
*G06F 18/25* (2023.01)

(52) U.S. Cl.
CPC ............ *G01S 19/31* (2013.01); *G01C 21/005* (2013.01); *G06F 18/22* (2023.01); *G06F 18/251* (2023.01); *G06V 20/56* (2022.01); *H04N 13/239* (2018.05)

(58) Field of Classification Search
CPC .......... G01S 19/31; G01S 19/45; G01S 19/47; G01C 21/005; G01C 21/30; G01C 21/3415; G01C 21/165; G06F 18/22; G06F 18/251; G06V 20/56; H04N 13/239
See application file for complete search history.

(56) References Cited

U.S. PATENT DOCUMENTS 6,748,325 B1\* 6/2004 Fujisaki ............... G08G 5/0056
701/301
8,380,384 B2\* 2/2013 Lee ........................ G06T 7/73
701/28

(Continued)

OTHER PUBLICATIONS

Harr Maximilian et al., Robust Localization on Highways Using Low-Cost GNSS, Front/Rear Mono Camera and Digital Maps, AmE 2018—Automotive meets Electronics; 9th GMM-Symposium, 2018, pp. 20-27.

(Continued)

*Primary Examiner* — Mussa A Shaawat
(74) *Attorney, Agent, or Firm* — Vivacqua Crane PLLC (57) ABSTRACT

A method of localizing a host member through sensor fusion includes capturing an input image with one or more optical sensors disposed on the host member and determining a location of the host member through a global positioning system (GPS) input. The method tracks movement of the host member through an inertial measurement unit (IMU) input, generates coordinates for the host member from the GPS input and the IMU input. The method compares the input image and a high definition (HD) map input to verify distances from the host member to predetermined objects within the input image and within the HD map input. The method continuously localizes the host member by fusing the GPS input, the IMU input, the input image, and the HD map input.

13 Claims, 4 Drawing Sheets

(56) References Cited

U.S. PATENT DOCUMENTS

| | | | | |
|---|---|---|---|---|
| 8,591,161 | B1* | 11/2013 | Bernhardt | G05D 1/0858 |
| | | | | 414/137.1 |
| 9,519,289 | B2* | 12/2016 | Munich | G05D 1/0274 |
| 9,751,210 | B2* | 9/2017 | Fong | B25J 9/1602 |
| 10,032,276 | B1* | 7/2018 | Liu | G06T 7/292 |
| 10,043,076 | B1* | 8/2018 | Zhang | G06V 10/464 |
| 11,048,277 | B1* | 6/2021 | Zhu | H04N 13/239 |
| 2010/0220173 | A1* | 9/2010 | Anguelov | G06T 7/70 |
| | | | | 348/148 |
| 2014/0316616 | A1* | 10/2014 | Kugelmass | G05D 1/104 |
| | | | | 701/8 |
| 2017/0089948 | A1* | 3/2017 | Ho | G01C 25/005 |
| 2017/0097640 | A1* | 4/2017 | Wang | G05D 1/0088 |
| 2018/0045519 | A1 | 2/2018 | Ghadiok et al. | |
| 2018/0224286 | A1* | 8/2018 | Pickering | G01C 21/3611 |
| 2018/0356823 | A1* | 12/2018 | Cooper | G08G 5/0013 |
| 2019/0003862 | A1* | 1/2019 | Reed | G01S 7/4026 |
| 2020/0029490 | A1* | 1/2020 | Bertucci | G06V 20/58 |
| 2020/0132461 | A1* | 4/2020 | Ondruska | G01C 21/3848 |
| 2021/0000006 | A1* | 1/2021 | Ellaboudy | G06V 20/56 |

OTHER PUBLICATIONS

Spangerberg et al., Pole-Based Localization for Autonomous Vehicles in Urban Scenarios, 2016 IEEE/RSJ International Conference on Intelligent Robots and Systems (IROS), Oct. 9, 2016, pp. 2161-2166, xp033011689, DOI:10.1109/IROS.20116.7759339.

* cited by examiner

LOCALIZATION OF AUTONOMOUS VEHICLES USING CAMERA, GPS, AND IMU

FIELD

The present disclosure is directed to a system and method of localizing autonomous vehicles using data from differing sensor types.

BRIEF DESCRIPTION

The statements in this section merely provide background information related to the present disclosure and may or may not constitute prior art.

Vehicle technologies such as free-ranging on grid navigation, as well as parking guidance and information systems, aid in the prevention of human error when drivers operate a vehicle. Such technologies have been used to improve navigation of roadways, and to augment the parking abilities of vehicle drivers while the drivers are present within the vehicle. For example, on-board detection systems and impact alert systems have been developed that assist the operator of the vehicle while maneuvering to avoid collisions. Typical on-board detection systems utilize machine vision for determining or predicting the surroundings of the vehicle. The detection systems often rely upon cameras, and/or other optical sensors to predict the position of the vehicle and the position of objects, road markings, and the like relative to the vehicle in order to aid autonomous driving systems of the vehicle.

While these systems and methods are useful for their intended purpose, typical detection systems are subject to optical interference caused by weather, debris, and the like, as well as, line-of-sight communications limitations, and inherent sensor inaccuracies. Accordingly, there is a need in the art for new and improved vehicle technologies that are robust in localizing vehicles even when the road surface is obscured by weather, debris, and the like, sensors may report inaccurate information, and line-of-sight communication may not be possible.

SUMMARY

According to several aspects of the present disclosure a method of localizing a host member through sensor fusion includes capturing an input image with one or more optical sensors disposed on the host member, determining a location of the host member through a global positioning system (GPS) input, tracking movement of the host member through an inertial measurement unit (IMU) input, and generating coordinates for the host member from the GPS input and the IMU input. The method further includes comparing the input image and a high definition (HD) map input to verify distances from the host member to predetermined objects within the input image and within the HD map input; and continuously localizing the host member by fusing the GPS input, the IMU input, the input image, and the HD map input.

In another aspect of the present disclosure the method further includes utilizing two or more optical sensors offset by a predetermined distance from one another to capture the input image. The input image is a three-dimensional (3D) image of surroundings of the host member.

In another aspect of the present disclosure the method further includes periodically communicating with a plurality of satellites to determine a first set of latitudinal and longitudinal coordinates defining a location of the host member within a first accuracy range.

In yet another aspect of the present disclosure the method further includes periodically estimating a location of the host member within the first accuracy range, wherein the first accuracy range is up to about 10 meters, and selectively correcting the first accuracy range through differential GPS (DGPS) to determine the location of the host member within a second accuracy range. The second accuracy range has a higher accuracy than the first accuracy range.

In yet another aspect of the present disclosure the method further includes continuously measuring movement of the host member with one or more attitude sensors including one or more gyroscopes, and one or more accelerometers. The one or more gyroscopes detect pitch, roll, and heading of the host member, and the one or more accelerometers detect linear acceleration of the host member.

In yet another aspect of the present disclosure each periodic communication between the plurality of satellites and the host member is separated by a predetermined period of time, each of the predetermined periods of time defining a time step, The method further includes refining an estimate of the host member's location by applying the IMU input to the GPS input at a previous time step to generate a second set of latitudinal and longitudinal coordinates defining the location of the host member.

In yet another aspect of the present disclosure the method further includes synchronizing the GPS input and the HD map input to detect and verify distances from the host member to the predetermined objects.

In yet another aspect of the present disclosure the method further includes filtering the GPS input and the IMU input, and passing the input image through a perception algorithm. The perception algorithm detects a plurality of objects within the input image and provides a distance estimation for each of the plurality of objects within the input image. The method further includes comparing the plurality of objects within the input image to predetermined objects within the HD map, and filtering the GPS input, the input image, and the IMU input through a Particle filter to determine a real-time physical location of the host member from an output of the Particle filter.

In yet another aspect of the present disclosure the method further includes utilizing a Kalman filter to fuse the GPS input and the IMU input; and determining coordinates for the host member using measurements from the GPS input and the IMU input.

In yet another aspect of the present disclosure the method further includes utilizing the Particle filter to fuse data acquired from each of the GPS input, the IMU input, the input image, and the HD map input; and determining a location of the host member. The method further includes periodically correcting for sensor drift in the IMU input by determining a location of the host member relative to an expected location of the host member from the HD map input, the GPS input, and the input image. The plurality of objects includes one or more of: a lane line, a sign, a pedestrian, a bicycle, a tree, and height and location information for curbs.

In still another aspect of the present disclosure a system for localizing a host member through sensor fusion includes one or more optical sensors disposed on the host member, a global positioning system (GPS), and an inertial measurement unit (IMU). The system further includes a control module disposed within the host member and having a processor, a memory, and one or more input/output (I/O)

ports. The I/O ports are in communication with and receive data from the one or more optical sensors, the GPS, and the IMU. The processor executes programmatic control logic stored within the memory. The programmatic control logic includes a first control logic for utilizing the one or more optical sensors to capture an input image. The programmatic control logic further includes a second control logic for utilizing the GPS to determine a location of the host member through a GPS input, and a third control logic for utilizing the IMU to track movement of the host vehicle through an IMU input. The programmatic control logic further includes a fourth control logic for generating coordinates for the host member from the GPS input and the IMU input, and a fifth control logic for comparing the input image and a high definition (HD) map input to verify distances from the host member to predetermined objects within the input image and within the HD map input. The programmatic control logic also synchronizes the GPS input and the HD map input to detect and verify distances from the host member to the predetermined objects. The programmatic control logic further includes a sixth control logic for continuously localizing the host member by fusing the GPS input, the IMU input, the input image, and the HD map input.

In yet another aspect of the present disclosure the system further includes at least two optical sensors, the at least two optical sensors offset by a predetermined distance from one another and capturing an input image. The input image is a three-dimensional (3D) image of surroundings of the host member.

In yet another aspect of the present disclosure the system further includes a seventh control logic for periodically communicating with a plurality of satellites to determine a first set of latitudinal and longitudinal coordinates defining a location of the host member within a first accuracy range.

In yet another aspect of the present disclosure the system further includes programmatic control logic for periodically estimating a location of the host member within the first accuracy range. The first accuracy range is up to about 10 meters. The programmatic control logic further includes selectively correcting the first accuracy range through differential GPS (DGPS) to determine the location of the host member within a second accuracy range such that the second accuracy range has a higher accuracy than the first accuracy range.

In yet another aspect of the present disclosure the system further includes programmatic control logic for continuously measuring movement of the host member with one or more attitude sensors comprising: one or more gyroscopes, and one or more accelerometers. The one or more gyroscopes detect pitch, roll, and heading of the host member, and the one or more accelerometers detect linear acceleration of the host member.

In yet another aspect of the present disclosure each periodic communication between the plurality of satellites and the host member is separated by a predetermined period of time. Each of the predetermined periods of time defining a time step. The system further includes programmatic control logic for refining an estimate of the host member's location by applying the IMU input to the GPS input at a previous time step to generate a second set of latitudinal and longitudinal coordinates defining the location of the host member.

In yet another aspect of the present disclosure the system further includes programmatic control logic for filtering the GPS input and the IMU input and passing the input image through a perception algorithm. The perception algorithm detects a plurality of objects within the input image and providing a distance estimation for each of the plurality of objects within the input image. The programmatic control logic compares the plurality of objects within the input image to predetermined objects within the HD map. The plurality of objects further includes one or more of: a lane line, a sign, a pedestrian, a bicycle, a tree, and height and location information for curbs. The system further includes programmatic control logic for filtering the GPS input, the input image, and the IMU input through a Particle filter; and determining a real-time physical location of the host member from an output of the Particle filter.

In yet another aspect of the present disclosure the system further includes programmatic control logic for utilizing a Kalman filter to fuse the GPS input and the IMU input, and determining coordinates for the host member using measurements from the GPS input and the IMU input.

In yet another aspect of the present disclosure the system further includes programmatic control logic for utilizing the particle filter to fuse data acquired from each of the GPS input, the IMU input, the input image, and the HD map input; and determining a location of the host member, and for periodically correcting for sensor drift in the IMU input by determining a location of the host member relative to an expected location of the host member from the HD map input, the GPS input, and the input image.

In yet another aspect of the present disclosure a method of localizing a host member through sensor fusion includes capturing an input image with two or more optical sensors disposed on the host member and offset by a predetermined distance from one another. The input image includes a two dimensional (2D) and a three-dimensional (3D) image of surroundings of the host member. The method further includes passing the input image through a perception algorithm, the perception algorithm detecting a plurality of objects within the input image and providing a distance estimation for each of the plurality of objects within the input image. The method further includes determining a location of the host member through a global positioning system (GPS) input. A GPS receiver in electronic communication with the host member periodically communicates with a plurality of satellites to determine a first set of latitudinal and longitudinal coordinates defining an estimated location of the host member within a first accuracy range. The first accuracy range is up to about 10 meters. Each periodic communication between the plurality of satellites and the GPS receiver is separated by a predetermined period of time, and each of the predetermined periods of time defines a time step. The method further includes selectively correcting the first accuracy range through differential GPS (DGPS) to determine the location of the host member within a second accuracy range. The second accuracy range has a higher accuracy than the first accuracy range. The method further includes continuously measuring movement of the host member with an inertial measurement unit (IMU) input. The IMU includes one or more attitude sensors comprising: one or more gyroscopes, and one or more accelerometers, and the one or more gyroscopes detect pitch, roll, and heading of the host member, and the one or more accelerometers detect linear acceleration of the host member. The method further includes generating coordinates for the host member from the GPS input and the IMU input, and refining the estimated location of the host member by applying the IMU input to the GPS input at a previous time step to generate a second set of latitudinal and longitudinal coordinates defining the location of the host member. The method further includes comparing and synchronizing the input image and a high definition (HD) map input to verify distances from the host member to predetermined objects within the input image and within the HD map input. The method further includes continuously localizing the host member by fusing the GPS input, the IMU input, the input image, and the HD map input by utilizing a Kalman filter to filter and fuse the GPS input and the IMU input and determining coordinates for the host member using measurements from the GPS input and the IMU input. The method further includes filtering the GPS input, the input image, the HD Map input, and the IMU input through a Particle filter, and generating a real-time physical location of the host member from an output of the Particle filter by utilizing the Particle filter to fuse data acquired from each of the GPS input, the IMU input, the input image, and the HD map input. The method further includes periodically correcting for sensor drift in the IMU input by determining a location of the host member relative to an expected location of the host member from the HD map input, the GPS input, and the input image; and wherein the plurality of objects includes one or more of: a lane line, a sign, a pedestrian, a bicycle, a tree, and height and location information for curbs.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application or uses.

Figure 1:
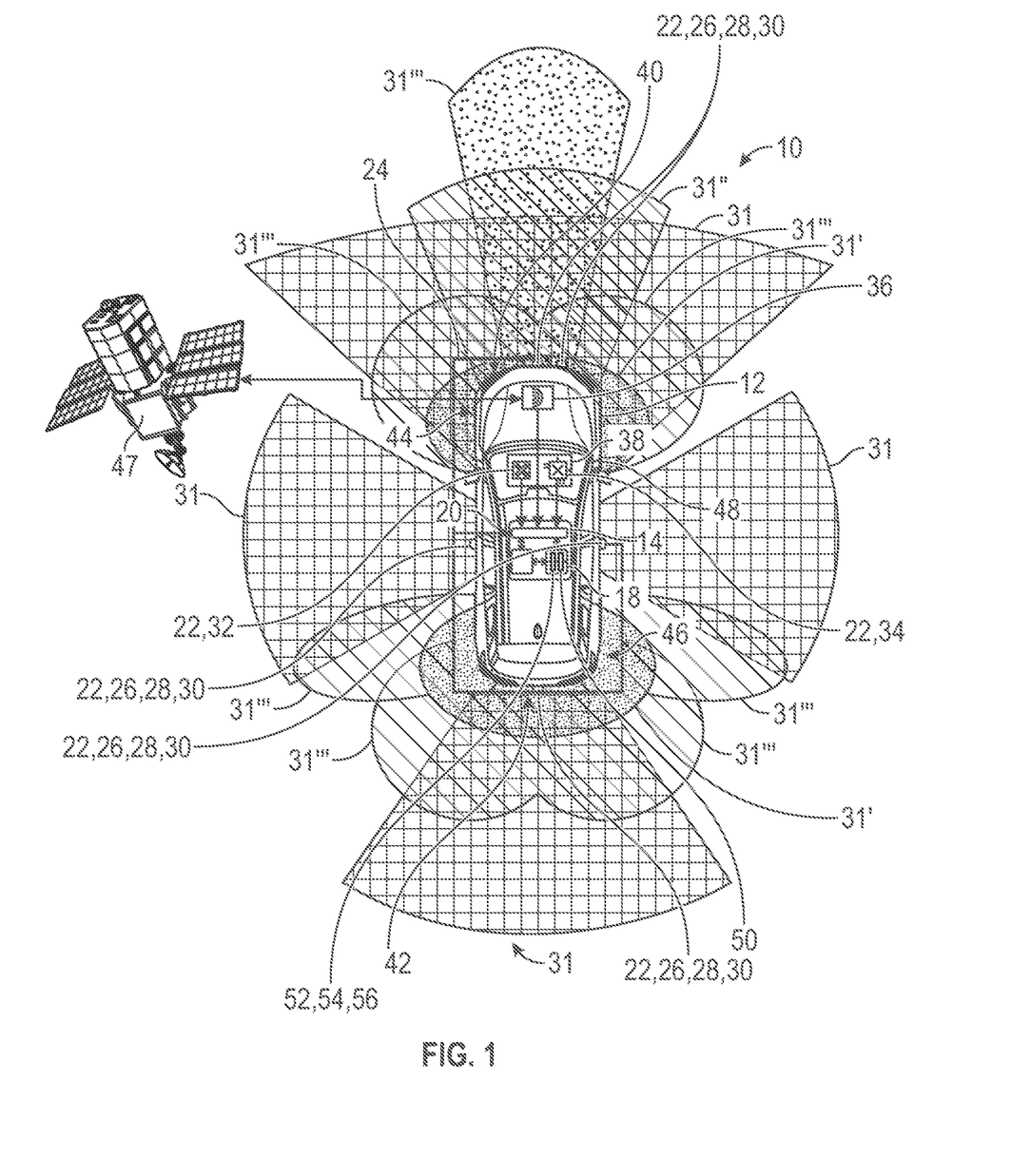
FIG. 1 is a schematic illustration of a system for localization of autonomous vehicles using cameras, GPS, IMU, and map input data, according to an aspect of the present disclosure.

With reference to FIG. 1, a system 10 for localizing a host member through sensor fusion is shown. The system 10 operates on a host member 12 such as a vehicle 12. The host member 12 is illustrated as a passenger vehicle, however the vehicle 12 may be a truck, sport utility vehicle, van, motor home, or any other type of road vehicle, water vehicle, or air vehicle without departing from the scope or intent of the present disclosure. The host member 12, may also be any other autonomously-piloted device, such as a water, air, or land-based drone vehicle, or the like.

The host member 12 is equipped with one or more control modules 14. Each control module 14 is a non-generalized electronic control device having a preprogrammed digital computer or processor 16, non-transitory computer readable medium or memory 18 used to store data such as control logic, instructions, image data, lookup tables, and the like, and a plurality of input/output (I/O) peripherals or ports 20. The processor 16 is configured to execute the control logic or instructions. The control logic or instructions include any type of computer executable program code, including source code, object code, and executable code. The control logic also includes software programs configured to perform a specific function or set of functions. The control logic may include one or more computer programs, software components, sets of instructions, procedures, functions, objects, classes, instances, related data, or a portion thereof adapted for implementation in a suitable computer readable program code. The control logic may be stored within the memory 18 or in additional or separate memory 18.

The control modules 14 may have additional processors 16 or additional integrated circuits in communication with the processors 16, such as perception logic circuits for analyzing visual data, or a dedicated vehicle-to-vehicle (V2V) or vehicle-to-infrastructure (V2I) circuits. Alternatively, the functions of the control module 14 may be distributed across a variety of sub-systems. The memory 18 includes media where data can be permanently stored and/or media where data can be stored and later overwritten, such as a rewritable optical disc or erasable memory device. In further examples, the memory 18 may include any of a variety of different storage media, such as flash memory, an embedded multimedia card (EMMC) flash memory, a random access memory (RAM), or the like. The I/O ports 20 receive input data from one or more sensors 22 of the host member 12.

The sensors 22 include an optical sensing system 24, having sensors 22 such as cameras 26, ultrasonic sensors, light detection and ranging (LiDAR) units 28, and radio detection and ranging (RADAR) units 30. In some examples, multiple different RADAR units 30 may be used to incorporate both short to medium range wavelengths as well as long-range RADAR capabilities. The cameras 26 may also be used in surround view localization, traffic sign recognition, parking assistance, lane departure warning systems, and the like. The sensors 22 of the optical sensing system 24 are shown in four distinct locations in FIG. 1, and each of the cameras 26, ultrasonic sensors, LiDAR units 28, RADAR units 30, and the like have respective fields of view 31, 31$^i$, 31$^{ii}$, 31$^{iii}$. However it should be appreciated that the sensors 22 may be located at any of a variety of different locations on or off the host member 12 and may have fields of view 31, 31$^i$, 31$^{ii}$, 31$^{iii}$ encompassing entirely different areas than those depicted without departing from the scope or intent of the present disclosure. Additional sensors 22 equipped to the host member 12 having a system 10 of the present disclosure include movement sensors, such as gyroscopes or gyroscopic sensors 32, accelerometers 34, global positioning system (GPS) communications devices or receivers 36, inertial measurement unit (IMU) 38 devices and the like.

In several aspects, the sensors 22 include cameras 26 located at a front 40, a rear 42, and along each of the left side 44 and right side 46 of the host member 12. Cameras 26 such as those mounted to the exemplary host member are currently relatively inexpensive by comparison to other optical sensing devices or sensors 22. However, other optical sensing devices or sensors 22 may be used in their stead. The cameras 26 offer robust modality for automotive applications in particular. By using a single camera 26 mounted at the front 40 of the host member 12, a field of view spanning an area extending for a predetermined distance in front of the host member 12, and extending for or even exceeding an arc of 180° in front of the host member 12 may be scanned for objects such as lane lines, signs, pedestrians, bicycles, trees, height and location information for curbs, as well as road surface data including berms, road roughness, lane markers, road hazards, and the like. The camera 26 offers a two-dimensional (2D) scan of the host member's 12 surroundings, however. 2D image prediction is highly useful, however in some examples, the system 10 makes use of two or more optical sensors or cameras 26 mounted to the front 40 of the host member 12.

Two cameras 26 spaced apart or offset from one another by a predetermined distance along the front 40 of the host member 12 provide stereoscopic vision which is used to generate a three-dimensional (3D) input image describing the host member's 12 surroundings. The 3D data provides increased robustness and success in tracking objects in comparison with 2D systems, though both are contemplated herein. In the use of a 3D camera 26 system the 3D data tracks objects such as: curbs, berms, road roughness, objects, lane markers, road hazards, and the like.

The GPS is a satellite-based navigation system made up of at least twenty-four (24) satellites 47 in orbit around the Earth. In many current examples, host members 12 or vehicles rely upon GPS for localization information. However, GPS success depends upon connection with a sufficient quantity of satellites 47. The ability to connect and communicate with GPS satellites 47 may be impeded, or lost due to a variety of reasons such as line-of-sight issues resulting from the presence of skyscrapers, mountains, tunnels, trees, and the like. Furthermore, GPS receivers 36 typically have a first accuracy range of within about 10 meters. In some examples, the system 10 utilizes differential GPS (DGPS) to increase the accuracy of the GPS signals to a second accuracy range that has higher accuracy than the first accuracy range. In an example, using DGPS, a GPS can self-correct to within an average of about one to three meters.

The IMU 38 is a device mounted to the host member 12 or vehicle. More specifically, the IMU 38 is mounted to a fixed location within the body 48 of the host member 12 or vehicle. IMUs 38 rely upon the fixed position within the host member 12 so that the IMU 38 is aware of its physical location within the host member 12. From the fixed position within the host member 12, the IMU continuously measures and tracks the movement and position of the host member 12. In some examples, the IMU 38 consists of several gyroscopic sensors 32 and accelerometers 34. The IMU 38 provides the control module 14 an indication of pitch, roll, and heading of the host member 12 as the host member 12 moves. In the example of gyroscopic sensors 36, the data generated by the IMU 38 is referred to as "rotational parameters", while the data generated by accelerometers 34 is known as "linear acceleration."

The system 10 also uses high definition maps (HD maps) 50. HD maps 50 are of high importance for host members 12 including self-driving vehicles and the like. HD maps are highly accurate, and capable of providing object locations with an accuracy of up to about ten centimeters (10 cm). Like cameras 26 in a 3D camera system, HD maps 50 increase the accuracy of localization of the host member 12, namely: HD maps assist in determining where in the real (i.e. non-virtual) world, the host member 12 is. Likewise, the HD maps 50 provide valuable information on surrounding objects: where traffic lanes are, which lanes go straight, while which other lanes are used for turns only, what traffic signs are nearby, the speed limit on a given stretch of road, the location of pedestrian crossings and bike lanes, height and location of curbs, and the like. Accordingly, the data in HD maps 50 is of great use in path planning for the host member 12.

The localization system 10 utilizes information gleaned from each of the camera 26, GPS, IMU 38, and HD map 50 systems described above to dramatically increase the precision and accuracy of host member 12 localization information relative to any of the above-referenced systems individually.

Figure 2:
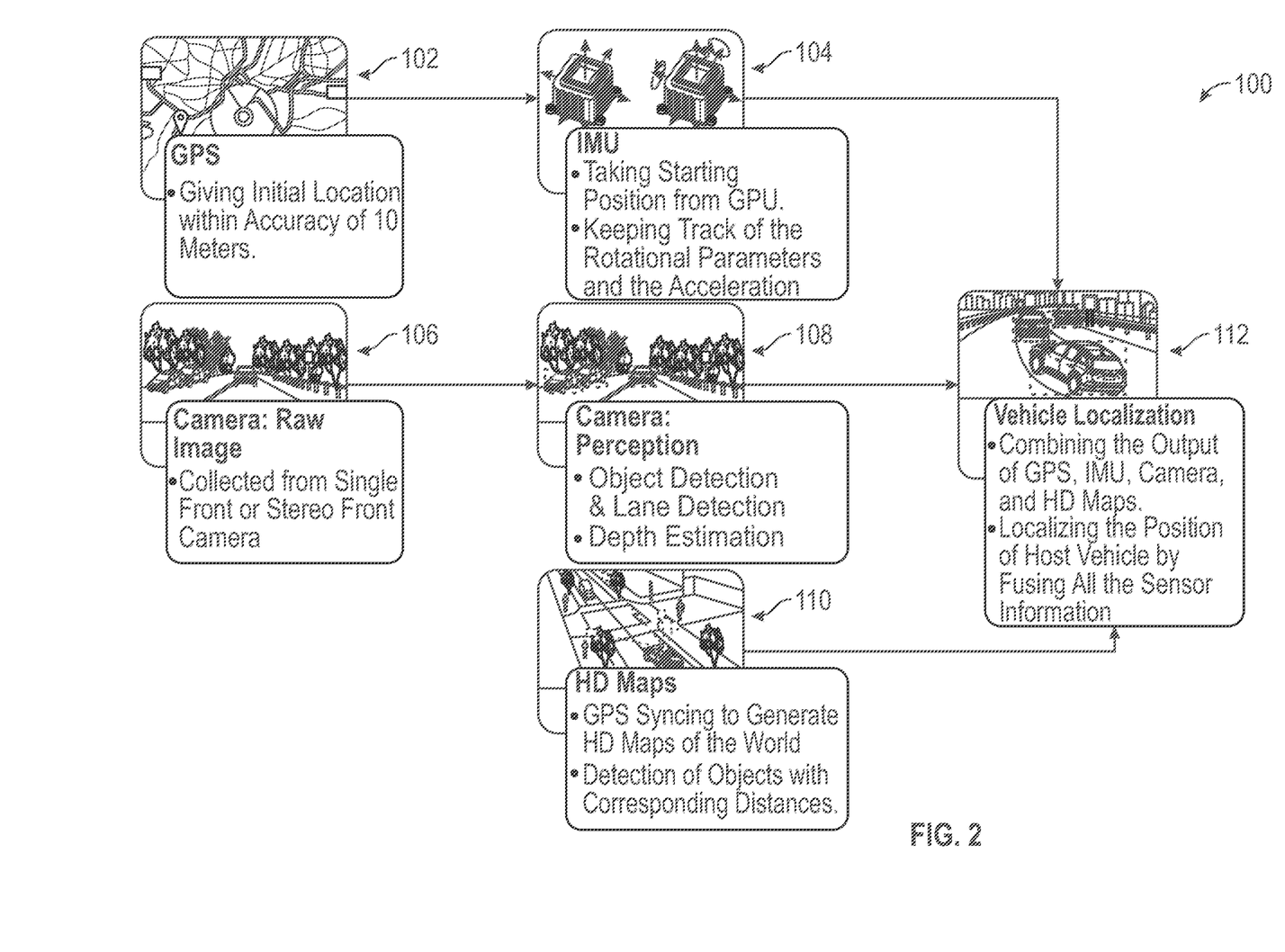
FIG. 2 is a high level flow chart of a series of logical steps taken by a system for localization of autonomous vehicles using cameras, GPS, IMU, and map input data according to an aspect of the present disclosure.

Turning now to FIG. 2, and with continuing reference to FIG. 1, logical functions of the system 10 are shown and generally indicated by reference number 100. At block 102, the system 10 utilizes the GPS receiver 36 to determine an initial position of the host member 12. More specifically, GPS signals from the satellites 47 to the GPS receiver 36 are in the form of data packets sent periodically. The data packets include at least a first set of latitudinal and longitudinal coordinates defining a location of the host member 12 within a first accuracy range. In an example, the data packets are received by the GPS receiver 36 about once every thirty seconds, and the first accuracy range locates the host member 12 to within about 10 meters. Accordingly, as the host member 12 moves during a period of time between GPS data packet receipts, the position of the host member 12 is tracked to maintain navigational accuracy and the like. Each period of time between the GPS data packets defines a time step. At block 104, in order to generate present coordinates of the host member 12 from the GPS receiver 36 input data and the IMU 38 data, the control module 14 executes control logic that refines an estimate of the host member's 12 location by applying the IMU 38 data to the GPS receiver 36 input data at a previous time step to generate a second set of latitudinal and longitudinal coordinates of the host member 12. The IMU 38 then uses the GPS receiver 36 data including the first and second sets of latitudinal and longitudinal coordinates as starting position for its movement calculations. The host member 12 is then driven, or in the case of a self-driving vehicle, the host member 12 drives itself for a brief period of time.

The IMU 38 tracks the rotational parameters and acceleration of the host member 12. An artificial intelligence (AI) program 52 stored within the memory 18 of the control module 14 and executed by the processor 16 receives the acceleration and rotational information from the IMU 38 and based on the data from the IMU 38, the AI program 52 updates a virtual model of where the host member 12 is at a given point in time. The AI program 52 subsequently causes the processor 16 to execute programmatic control logic that utilizes a Kalman filter to fuse information from the GPS receiver 36 and the IMU 38 to generate location coordinates for the new location of the host member 12 in the real world.

At block 106, the system 10 collects raw image data from the camera or cameras 26 mounted to the host member 12. At block 108, through a perception algorithm 54 stored within the memory 14 and executed by the processor 16, the camera or cameras 26 generates detection information for objects like cars, trucks, pedestrians, traffic signs, lane lines, other lane information, and the like. By either using a single camera 26, or stereo cameras 26, the system 10 uses the perception algorithm 54 to determine lateral and longitudinal distances to all objects and lanes within the field of view of the camera or cameras 26. At block 110, the data from the cameras 26 and the GPS receiver 36 is then compared to the HD maps 50 to determine distances to predetermined landmarks, for example specific traffic signals, signs, or the like, as reported by the camera 26.

At block 112, the control module 14 then executes a Particle filter algorithm 56 to fuse all of the data obtained from the various sensors 22, including the camera(s) 26, GPS receiver 36, IMU 38, and HD Maps 50 to localize the host member 12 in the real world. More specifically, the Particle filter algorithm 56 utilizes the GPS receiver 36 to set an initial position of the host member 12 on the ground, the camera(s) 26 then optically scan the host member's 12 surroundings to capture and locate objects, such as signs. The camera(s) 26 assign coordinates to each of the objects in the image data they capture. The Particle filter algorithm 56 then utilizes the HD Maps 50 to compare objects located in the data from the camera(s) 26 to the locations of objects in precise predetermined positions in the HD map 50 data. Between subsequent satellite 47 communications with the GPS receiver 36, the Particle filter algorithm 56 utilizes the IMU 38 to track the physical movements of the host member 12.

Figure 3:
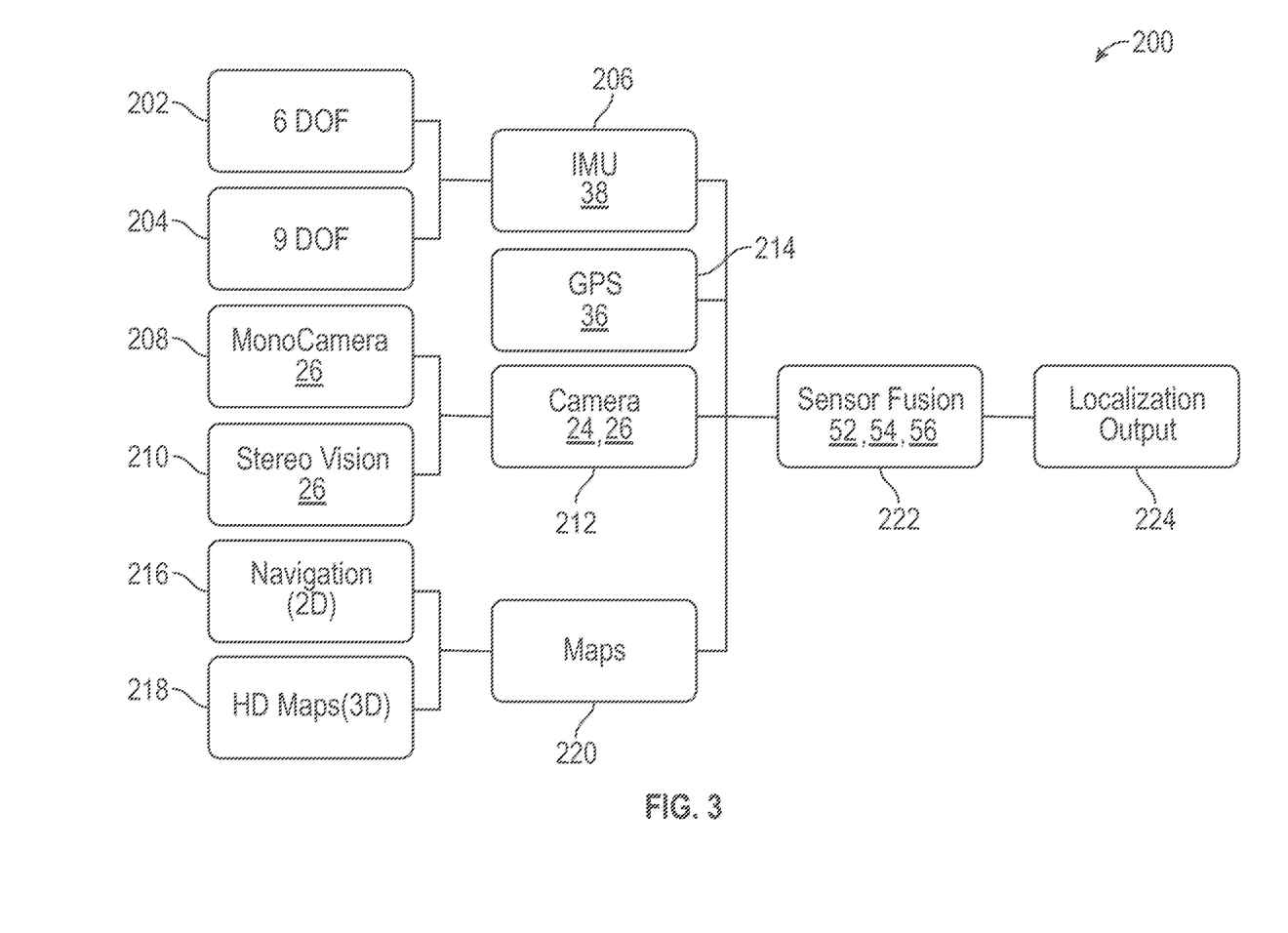
FIG. 3 is a depiction of a high level hierarchy of sensor fusion in a system for localization of autonomous vehicles using cameras, GPS, IMU, and map input data according to an aspect of the present disclosure.

Turning now to FIG. 3, and with continuing reference to FIGS. 1 and 2, a high level hierarchy of the sensor fusion is shown and generally indicated by reference number 200. At blocks 202 and 204, the gyroscopic sensors 32 and accelerometers 34 of the IMU 38 collect host member 12 movement data. Specifically, the gyroscopic sensors 32 detect information in up to nine degrees of freedom (9 DOF), while the accelerometers 34 detect movement in up to six degrees of freedom (6 DOF). In several aspects, a degree of freedom (DOF) is a direction in which a sensor 22, such as gyroscopic sensor 32 and accelerometer 34 can detect movement and/or position in three-dimensional (3D) space. In an exemplary 9 DOF gyroscopic sensor 32, the gyroscopic sensor 32 can detect movement and/or position in the form of three degrees each of acceleration, magnetic orientation, and angular velocity. Likewise, a 6 DOF accelerometer 32 may detect movement and/or position in the form of acceleration along the three principal axes, namely: X, Y, and Z axes, as well as detecting rotation about each of the three principal axes. The IMU 38 collects the movement data from both the gyroscopic sensors 32 and accelerometers 34 at block 206.

At blocks 208 and 210, the camera system collects optical camera data in the form of an input image from single and/or stereoscopic cameras 26 mounted to the host member 12. The input image collected from the single and/or stereoscopic cameras 22 is combined by the camera system at block 212.

At block 214, the system 10 collects a GPS position of the host member 12 from the GPS receiver 36. At blocks 216 and 218, the system 10 collects information to generate maps. More specifically, at block 216, the system 10 collects two-dimensional (2D) navigational position information from the GPS, and at block 218 the system 10 collects an HD map 50 position of the host member 12 within the HD Maps 50. The system 10 combines the 2D position information and the HD map position of the host member 12 at block 220.

At block 222, the control module 14 causes the processor 16 to execute programmatic control logic stored in memory to filter and fuse data from the various sensors 22 noted in steps 202-220 in the Particle filter algorithm 56. Specifically, the Particle filter algorithm 56 utilizes the GPS receiver 36 to set an initial position of the host member 12 on the ground. The initial position determined from the GPS receiver 36 data places the host member 12 with a first accuracy of about 10 meters of the actual position of the host member 12 on the surface of the Earth. Input image captures and locates objects, such as signs, and the camera(s) 26 also detect and estimate distances from the host member 12 to each of the objects detected in the input image. The control module 14 then assigns coordinates to each of the objects in the image data captured by the camera(s) 26. The Particle filter algorithm 56 then utilizes the HD Maps 50 to compare the input image to the HD maps 50 to verify distances from the host member 12 to predetermined objects within the input image which also appear in the HD map 50. Likewise, the Particle filter algorithm 56 compares the HD maps 50 to location estimates obtained from the GPS receiver 36. More specifically, the GPS receiver 36 input is compared to and synchronized with the HD Map 50 input data to detect and verify distances from the host member 12 to predetermined objects within the input image.

The IMU 38 utilizes the initial position captured by the GPS receiver 36 as a starting point for movement calculations. Between subsequent satellite 47 data packet communications with the GPS receiver 36, the Particle filter algorithm 56 utilizes the IMU 38 to track the physical movements of the host member 12. Specifically, the IMU 38 tracks rotational parameters, acceleration parameters, and magnetological (e.g. compass) parameters of the host member 12. However, the IMU 38 is itself subject to a predetermined amount of sensor error. Over time and iterations of use, calculations of host member 12 location in the real world based on data from the IMU 38 may depart from the actual physical location of the host member 12. Accordingly, the control module 14 periodically corrects for such sensor drift in the IMU 38 data by determining a location of the host member 12 relative to an expected location of the host member 12 from the HD map 50 data, the GPS receiver 36 data, and the input image data from the camera(s) 26. At block 224, the control module 14, via the Particle filter algorithm 56 produces a localization output.

In several aspects, the localization output is a determination of the host member's 12 location in the real world. The localization output is more accurate and more robust than any of the host member 12 location data produced by a single sensor 22 or individual suite of sensors 22 such as the camera(s) 26, or the GPS receiver 36, or the IMU 38, or the HD Maps 50 alone. In fact, the localization output is of higher accuracy and robustness than a permutation or combination of at least any two sensors 22 or sensor suites such as the camera(s) 26 and GPS receiver 36, or the camera(s) 26 and the IMU 38, or the camera(s) 26 and the HD Maps 50, or the GPS receiver 36 and the IMU 38, or the GPS receiver 36 and the HD Maps 50, or the IMU 38 and the HD Maps 50. The control module 14 continuously and recursively localizes and determines a real time location of the host member 12 by fusing the data from the GPS receiver 36, the IMU 38, the HD Maps 50 and the input image and generating a Particle filter output.

Figure 4:
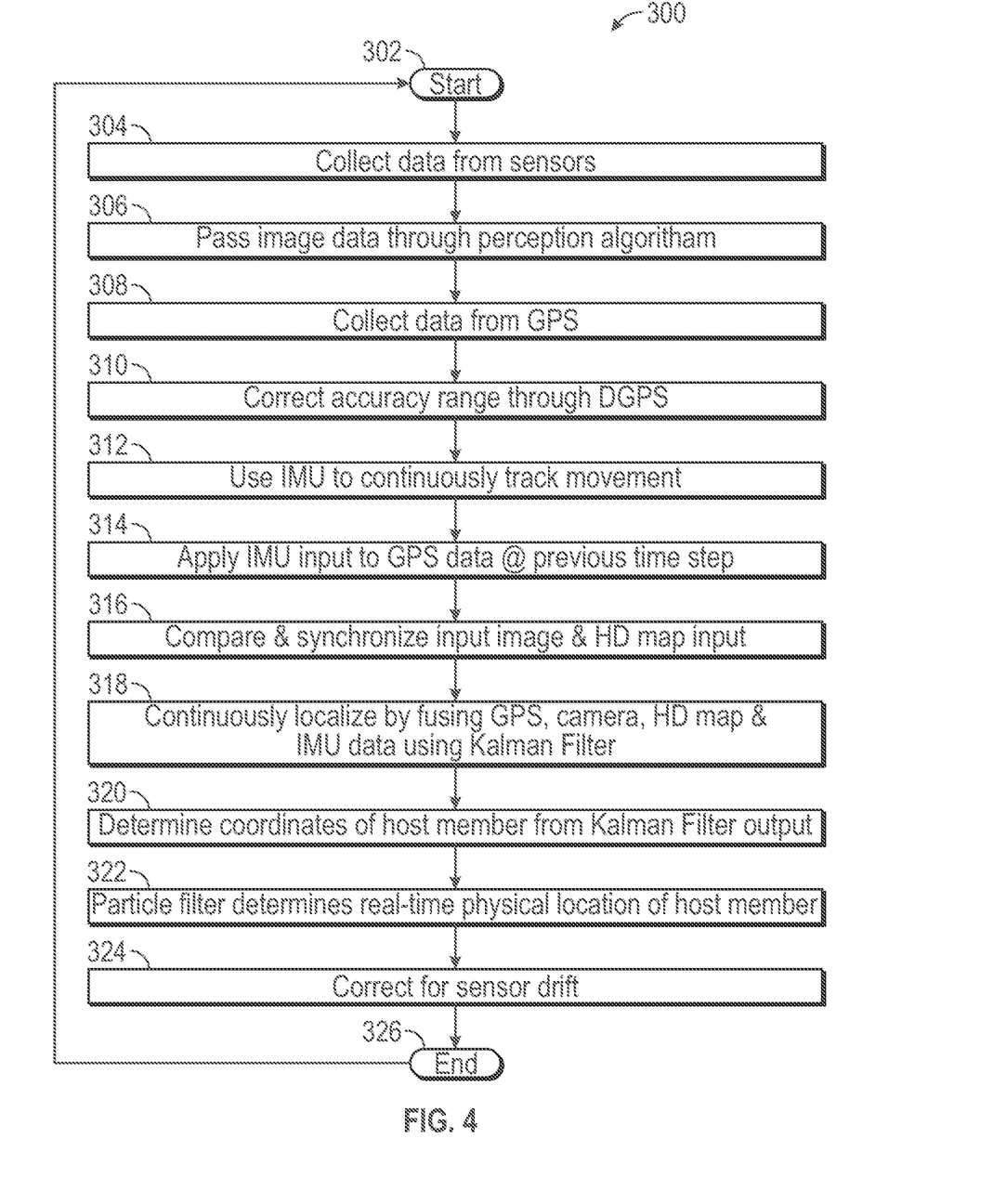
FIG. 4 is a flowchart depicting a method of localization of autonomous vehicles using cameras, GPS, IMU, and map input data according to an aspect of the present disclosure.

Turning now to FIG. 4, and with continued reference to FIGS. 1-3, a method 300 for localizing autonomous vehicles using camera(s) 26, GPS 36, and IMU 38 is shown. The method 300 begins at block 302. At block 304 the system 10 utilizes a plurality of sensors 22 disposed on the host member 12 or vehicle to capture data. Specifically, at block 304, the system captures an input image with two or more cameras 26 or optical sensors 22 disposed on the host member 12. At block 306, the input image is passed through a perception algorithm which detects a plurality of objects in the input image and provides a distance estimation for each of the plurality of objects within the input image. At block 308, the system 10 utilizes a GPS receiver 36 to communicate with a plurality of satellites 47 in orbit around the Earth and to periodically receive a first set of latitudinal and longitudinal coordinates defining an estimate of the location of the host member 12 within an accuracy range of about ten meters. Each of the periodic communications between the GPS receiver 36 and the plurality of satellites 47 is separated by a predetermined amount of time defining a time step. At block 310, the system 10 selectively corrects the first accuracy range through the use of DGPS to increase the accuracy of the GPS-determined latitudinal and longitudinal coordinates of the host member 12 to a second accuracy range having higher accuracy than the first accuracy range. At block 312, the system continuously measures movement of the host member 12 through the IMU 38 so that during periods of time in which the GPS receiver 36 is not actively receiving GPS location information from the satellites 47, the system 10 estimates the position of the host member 12 through gyroscopic sensors, accelerometers, and magnetometers, or the like. At block 314, the system 10 refines the estimated location of the host member 12 by applying the IMU 38 input data to the GPS receiver 36 input data from a previous time step to generate a second set of latitudinal and longitudinal coordinates defining a current location of the host member 12.

At block 316, the system 10 compares and synchronizes the input image and the HD map 50 input data to verify distances from the host member 12 to predetermined objects that appear in both the input image and the HD map 50 data. At block 318, the system 10 continuously localizes the host member 12 by fusing the GPS receiver 36 input, the IMU 38 input, the input image, and the HD map 50 input through a Kalman filter. More specifically, at block 318, the Kalman filter is used to filter and fuse the GPS receiver 36 input and the IMU 38 input. At block 320, the Kalman filter output is used to determine coordinates for the host member 12 using the GPS receiver 36 input and IMU 38 input measurements. At block 322, the GPS receiver 36 input, the IMU 38 input, and the input image are filtered through a Particle filter algorithm 56. The particle filter algorithm 56 generates an output defining a real-time physical location of the host member 12 by fusing the data acquired from each of the GPS receiver 36, the IMU 38, the input image, and the HD map 50. At block 324, the system 10 periodically corrects for sensor drift in the IMU 38 input data by determining a location of the host member 12 relative to an expected location of the host member 12 from the HD Map 50 input, the GPS receiver 36 input, and the input image. At block 326, the method ends and returns iteratively and continuously to block 302 where the method 300 runs again. It should be appreciated that the method 300 may run a single time, or any number of additional times thereafter, depending on the conditions during which the host member 12 and system 10 are being operated.

A system 10 and method 300 for localizing a host member 12, such as an autonomous driving vehicle, utilizing HD Maps 50, IMU 38, GPS receiver 36 data, and cameras 26 offers several advantages including: robustness and redundancy, the ability to continue to function accurately and precisely in inclement weather and without line-of-sight communications. Additionally, because the system 10 and method 300 of the present disclosure utilize sensors 22 already equipped to a wide variety of host members 12, the system 10 and method 300 offer increased functionality, safety, and the like without increasing part cost, production cost, or part or production complexity.

The description of the present disclosure is merely exemplary in nature and variations that do not depart form the gist of the present disclosure are intended to be within the scope of the present disclosure. Such variations are not to be regarded as a departure from the spirit and scope of the present disclosure.

What is claimed is:

1. A method of localizing a host member through sensor fusion, the method comprising:
   capturing an input image with one or more optical sensors disposed on the host member;
   determining a location of the host member through a global positioning system (GPS) input, including periodically communicating with a plurality of satellites to determine a first set of latitudinal and longitudinal coordinates defining a location of the host member within a first accuracy range;
   periodically estimating a location of the host member within the first accuracy range, wherein the first accuracy range is up to about 10 meters; and
   selectively correcting the first accuracy range through differential GPS (DGPS) to determine the location of the host member within a second accuracy range, wherein the second accuracy range has a higher accuracy than the first accuracy range;
   tracking movement of the host member through an inertial measurement unit (IMU) input including continuously measuring movement of the host member with one or more attitude sensors comprising: one or more gyroscopes, and one or more accelerometers, wherein the one or more gyroscopes detect pitch, roll, and heading of the host member, and wherein the one or more accelerometers detect linear acceleration of the host member;
   generating coordinates for the host member from the GPS input and the IMU input, wherein each periodic communication between the plurality of satellites and the host member is separated by a predetermined period of time, each of the predetermined periods of time defining a time step, and
      wherein generating coordinates for the host member from the GPS input and the IMU input further comprises refining an estimate of the host member's location by applying the IMU input to the GPS input at a previous time step to generate a second set of latitudinal and longitudinal coordinates defining the location of the host member;
   comparing the input image and a high definition (HD) map input to verify distances from the host member to a predetermined plurality of objects within the input image and within the HD map input; and
   continuously localizing the host member by fusing the GPS input, the IMU input, the input image, and the HD map input; and
   periodically correcting for sensor drift in the IMU input by determining a location of the host member relative to an expected location of the host member from the HD map input, the GPS input, and the input image; and
   wherein the plurality of objects includes one or more of: a lane line, a sign, a pedestrian, a bicycle, a tree, and height and location information for curbs.

2. The method of claim 1 wherein capturing an input image further comprises:
   utilizing two or more optical sensors offset by a predetermined distance from one another to capture the input image, wherein the input image is a three-dimensional (3D) image of surroundings of the host member.

3. The method of claim 1 wherein comparing the input image and a high definition (HD) map input to verify distances from the host member to predetermined objects within the input image and within the HD map input further comprises:

synchronizing the GPS input and the HD map input to detect and verify distances from the host member to the predetermined objects.

4. The method of claim 1 wherein continuously localizing the host member by fusing the GPS input, the IMU input, the input image, and the HD map input further comprises:
   filtering the GPS input and the IMU input;
   passing the input image through a perception algorithm, the perception algorithm detecting a plurality of objects within the input image and providing a distance estimation for each of the plurality of objects within the input image;
   comparing the plurality of objects within the input image to predetermined objects within the HD map;
   filtering the GPS input, the input image, and the IMU input through a Particle filter; and
   determining a real-time physical location of the host member from an output of the Particle filter.

5. The method of claim 4 wherein filtering the GPS input and the IMU input further comprises:
   utilizing a Kalman filter to fuse the GPS input and the IMU input; and
   determining coordinates for the host member using measurements from the GPS input and the IMU input.

6. The method of claim 4 wherein determining a real-time physical location of the host member from an output of the Particle filter further comprises:
   utilizing the Particle filter to fuse data acquired from each of the GPS input, the IMU input, the input image, and the HD map input; and
   determining a location of the host member periodically correcting for sensor drift in the IMU input by determining a location of the host member relative to an expected location of the host member from the HD map input, the GPS input, and the input image; and wherein the plurality of objects includes one or more of: a lane line, a sign, a pedestrian, a bicycle, a tree, and height and location information for curbs.

7. A system for localizing a host member through sensor fusion, the system comprising:
   one or more optical sensors disposed on the host member;
   a global positioning system (GPS);
   an inertial measurement unit (IMU);
   a control module disposed within the host member and having a processor, a memory, and one or more input/output (I/O) ports; the I/O ports in communication with and receiving data from the one or more optical sensors, the GPS, and the IMU, the processor executing programmatic control logic stored within the memory, the programmatic control logic including:
   a first control logic for utilizing the one or more optical sensors to capture an input image;
   a second control logic for utilizing the GPS to determine a location of the host member through a GPS input;
   a third control logic for utilizing the IMU to track movement of the host member through an IMU input, including continuously measuring movement of the host member with one or more attitude sensors comprising: one or more gyroscopes, and one or more accelerometers, wherein the one or more gyroscopes detect pitch, roll, and heading of the host member, and wherein the one or more accelerometers detect linear acceleration of the host member;
   a fourth control logic for generating coordinates for the host member from the GPS input and the IMU input;
   a fifth control logic for comparing the input image and a high definition (HD) map input to verify distances from the host member to predetermined objects within the input image and within the HD map input, and synchronizing the GPS input and the HD map input to detect and verify distances from the host member to the predetermined objects; and
   a sixth control logic for continuously localizing the host member by fusing the GPS input, the IMU input, the input image, and the HD map input; and
   a seventh control 100C for periodically communicating with a plurality of satellites to determine a first set of latitudinal and longitudinal coordinates defining a location of the host member within a first accuracy range, and periodically estimating a location of the host member within the first accuracy range, wherein the first accuracy range is up to about 10 meters;
      selectively correcting the first accuracy range through differential GPS (DGPS) to determine the location of the host member within a second accuracy range, wherein the second accuracy range has a higher accuracy than the first accuracy range; and
   periodically correcting for sensor drift in the IMU input by determining a location of the host member relative to an expected location of the host member from the HD map input, the GPS input, and the input image.

8. The system of claim 7 further comprising at least two optical sensors, the at least two optical sensors offset by a predetermined distance from one another and capturing the input image, wherein the input image is a three-dimensional (3D) image of surroundings of the host member.

9. The system of claim 7 wherein each periodic communication between the plurality of satellites and the host member is separated by a predetermined period of time, each of the predetermined periods of time defining a time step, and
   wherein the fourth control logic further comprises refining an estimate of the host member's location by applying the IMU input to the GPS input at a previous time step to generate a second set of latitudinal and longitudinal coordinates defining the location of the host member.

10. The system of claim 7 wherein the sixth control logic further comprises:
    filtering the GPS input and the IMU input;
    passing the input image through a perception algorithm, the perception algorithm detecting a plurality of objects within the input image and providing a distance estimation for each of the plurality of objects within the input image;
    comparing the plurality of objects within the input image to predetermined objects within the HD map, wherein the plurality of objects further includes one or more of: a lane line, a sign, a pedestrian, a bicycle, a tree, and height and location information for curbs;
    filtering the GPS input, the input image, and the IMU input through a Particle filter; and
    determining a real-time physical location of the host member from an output of the Particle filter.

11. The system of claim 10 wherein filtering the GPS input and the IMU input further comprises:
    utilizing a Kalman filter to fuse the GPS input and the IMU input; and
    determining coordinates for the host member using measurements from the GPS input and the IMU input.

12. The system of claim 10 wherein determining a real-time physical location of the host member from an output of the Particle filter further comprises:

utilizing the particle filter to fuse data acquired from each of the GPS input, the IMU input, the input image, and the HD map input; and determining a location of the host member.

13. A method of localizing a host member through sensor fusion, the method comprising:

capturing an input image with two or more optical sensors disposed on the host member and offset by a predetermined distance from one another, wherein the input image includes a two dimensional (2D) and a three-dimensional (3D) image of surroundings of the host member;

passing the input image through a perception algorithm, the perception algorithm detecting a plurality of objects within the input image and providing a distance estimation for each of the plurality of objects within the input image;

determining a location of the host member through a global positioning system (GPS) input, wherein a GPS receiver in electronic communication with the host member periodically communicates with a plurality of satellites to determine a first set of latitudinal and longitudinal coordinates defining an estimated location of the host member within a first accuracy range, wherein the first accuracy range is up to about 10 meters, wherein each periodic communication between the plurality of satellites and the GPS receiver is separated by a predetermined period of time, each of the predetermined periods of time defining a time step;

selectively correcting the first accuracy range through differential GPS (DGPS) to determine the location of the host member within a second accuracy range, wherein the second accuracy range has a higher accuracy than the first accuracy range;

continuously measuring movement of the host member with an inertial measurement unit (IMU) input, wherein the IMU includes one or more attitude sensors comprising: one or more gyroscopes, and one or more accelerometers, wherein the one or more gyroscopes detect pitch, roll, and heading of the host member, wherein the one or more accelerometers detect linear acceleration of the host member;

generating coordinates for the host member from the GPS input and the IMU input;

refining the estimated location of the host member by applying the IMU input to the GPS input at a previous time step to generate a second set of latitudinal and longitudinal coordinates defining the location of the host member;

comparing and synchronizing the input image and a high definition (HD) map input to verify distances from the host member to predetermined objects within the input image and within the HD map input;

continuously localizing the host member by fusing the GPS input, the IMU input, the input image, and the HD map input by:

utilizing a Kalman filter to filter and fuse the GPS input and the IMU input; and determining coordinates for the host member using measurements from the GPS input and the IMU input;

filtering the GPS input, the input image, the HD Map input, and the IMU input through a Particle filter; and generating a real-time physical location of the host member from an output of the Particle filter by utilizing the Particle filter to fuse data acquired from each of the GPS input, the IMU input, the input image, and the HD map input; and periodically correcting for sensor drift in the IMU input by determining a location of the host member relative to an expected location of the host member from the HD map input, the GPS input, and the input image; and wherein the plurality of objects includes one or more of: a lane line, a sign, a pedestrian, a bicycle, a tree, and height and location information for curbs.

* * * * *